United States Patent
Weiglhofer et al.

(10) Patent No.: US 6,548,932 B1
(45) Date of Patent: Apr. 15, 2003

(54) NONMAGNETIC MAGNET RETENTION CHANNEL ARRANGEMENT FOR HIGH SPEED ROTORS

(75) Inventors: John Weiglhofer, Lyme, CT (US); Stewart Peil, Norwich, CT (US); Pieter Van Dine, Mystic, CT (US)

(73) Assignee: Electric Boat Corporation, Groton, CT (US)

( * ) Notice: Subject to any disclaimer, the term of this patent is extended or adjusted under 35 U.S.C. 154(b) by 0 days.

(21) Appl. No.: 10/100,792

(22) Filed: Mar. 19, 2002

Related U.S. Application Data

(63) Continuation-in-part of application No. 10/002,786, filed on Nov. 2, 2001, and a continuation-in-part of application No. 09/998,973, filed on Oct. 31, 2001.

(51) Int. Cl.⁷ .............................................. H02K 21/12
(52) U.S. Cl. ................................................... 310/156.19
(58) Field of Search ...................... 310/156.01–156.84, 310/261, 262

(56) References Cited

U.S. PATENT DOCUMENTS

| | | | |
|---|---|---|---|
| 2,516,901 A | 8/1950 | Morrill | |
| 4,179,634 A | 12/1979 | Burson | |
| 4,745,319 A | 5/1988 | Tomite et al. | |
| 5,191,255 A | 3/1993 | Kloosterhouse et al. | |
| 5,811,908 A | * | 9/1998 | Iwata et al. ............ 310/156.08 |
| 5,973,435 A | 10/1999 | Irie et al. | |
| 6,150,746 A | 11/2000 | Lechner | |
| 6,376,956 B1 | * | 4/2002 | Hosoya ................. 310/154.17 |

* cited by examiner

Primary Examiner—Nestor Ramirez
Assistant Examiner—Nguyen Hanh

(57) ABSTRACT

In the magnet retention channel arrangement for a high speed rotor described in the specification, a rotor has an array of radially projecting, angularly spaced pole pieces and a magnet retention channel member inserted between each adjacent pair of pole pieces. Each magnet retention channel member is made of nonmagnetic material and has opposed side walls and an integral end wall at one end of the side walls and integral dovetail feet at the opposite ends of side walls. The channels contain permanent magnets and the side walls of uniform thickness with nonmagnetic feet within the core member couple the magnetic flux from the magnets to the pole pieces with substantially no magnetic discontinuities while the presence of the nonmagnetic end wall avoids magnetic shorting.

13 Claims, 2 Drawing Sheets

NONMAGNETIC MAGNET RETENTION CHANNEL ARRANGEMENT FOR HIGH SPEED ROTORS

REFERENCE TO RELATED APPLICATIONS

This application is a continuation-in-part of copending applications Ser. No. 09/998,973, filed Oct. 31, 2001, for "Magnet Retention Channel Arrangement for High Speed Operation" and Ser. No. 10/002,786, filed Nov. 2, 2001, for "Permanent Magnet Retaining Arrangement for High Speed Rotors", the disclosures of which are incorporated by reference herein.

BACKGROUND OF THE INVENTION

This invention relates to arrangements for holding magnets on components such as rotors of electrical machines that rotate at high speed.

In conventional permanent magnet electrical machines, magnets are radially retained on a rotor by nonmagnetic caps which are keyed into adjacent pole pieces or by providing angled sides on the magnet which are radially retained by wedged-shaped adjacent laminated pole pieces. Such arrangements, however, do not provide sufficient strength to hold a magnet securely in position when subjected to the radial accelerations encountered in high speed machines. In such arrangements, moreover, the pole pieces are subjected to increased stress as a result of the added radial load of the magnet during high speed operation. Furthermore, when angled sides of a magnet are engaged by wedged-shaped adjacent pole pieces, the radial location of the magnet may change, causing imbalance in the rotor. Also, such magnet support arrangements introduce flux path discontinuities in dovetails and oblique surfaces of the components in the magnetic flux path which decrease the efficiency of the machine. Moreover, the use of mechanical fastening arrangements such as bolts or screws requires access holes through magnet holders or pole pieces to permit insertion of fastening devices.

The Iwata U.S. Pat. No. 5,811,908 discloses U-shaped permanent magnet retention channels in which the outer ends of the channel walls have projections to be received in corresponding grooves in adjacent pole pieces and the entire channel is made of a single piece of magnetic material.

In the patent to Irie et al. U.S. Pat. No. 5,973,435 permanent magnets are assembled within protective nonmagnetic holders having nonmagnetic metal facings with projections by which they are secured to a nonmagnetic connecting band.

The Kloosterhouse et al. U.S. Pat. No. 5,191,255 shows a permanent magnet mounted in a U-shaped channel having laterally projecting tabs which receive screws for affixing the channel to a rotor.

The Burson U.S. Pat. No. 4,179,634 discloses a magneto rotor having permanent magnets which are retained in a cavity formed in the rotor by pole pieces disposed on opposite sides of the magnet and retained by retaining pins received in axially extending slots in the pole pieces.

The Patent to Morill U.S. Pat. No. 2,516,901 discloses a permanent magnet rotor having a hub to which permanent magnets are affixed by screws engaging shoulders on the magnets. In addition, rings may be cast around the shoulders of the magnets and the screws to assist in retaining the magnets on the hub.

In the magneto shown in the Iwata et al. U.S. Pat. No. 5,811,908, U-shaped permanent magnet retention channels made of magnetic material have projections at the outer ends of the walls which are received in corresponding grooves in adjacent pole pieces.

According to the Tomite et al. U.S. Pat. No. 4,745,319, permanent magnets are secured to the inner surface of a surrounding yoke by attaching one surface of a U-shaped elastic retainer member to the inner surface of the yoke and attaching the ends of the U-shaped retainer to edges of adjacent magnets which are to be retained in the yoke.

The Lechner et al. U.S. Pat. No. 6,150,746 discloses a U-shaped permanent magnet retaining channel made of nonmagnetic material having tabs that are welded to pole plates.

SUMMARY OF THE INVENTION

Accordingly, it is an object of the present invention to provide a magnet retention arrangement for high speed electric machine rotors which overcomes disadvantages of the prior art.

Another object of the invention is to provide a magnet retention arrangement for high speed rotors by which a magnet is securely retained in the radial direction in a rotor operating at high speed without introducing flux path discontinuities.

These and other objects of the invention are attained by providing a magnet retainer which is a U-shaped channel member made of nonmagnetic material which is supported from a rotor hub by interlocking connections between the radially inner ends of the sides of the channel member and the hub. Preferably, the inner ends of the sides of the channel member have lateral projections which are received in corresponding grooves in the rotor hub. The magnets may be inserted into the magnet retention channel before or after the channel is slidably inserted in the corresponding grooves in the nonmagnetic core. By providing interlocking engagement between the hub and the channel member, the necessity for insertion of mechanical fasteners such as bolts or screws is avoided. Moreover, by using a channel member which is made of nonmagnetic material the necessity for bonding or forming a channel member from different parts which are magnetic and nonmagnetic, and the resultant reduction in strength in the channel member, is avoided.

DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
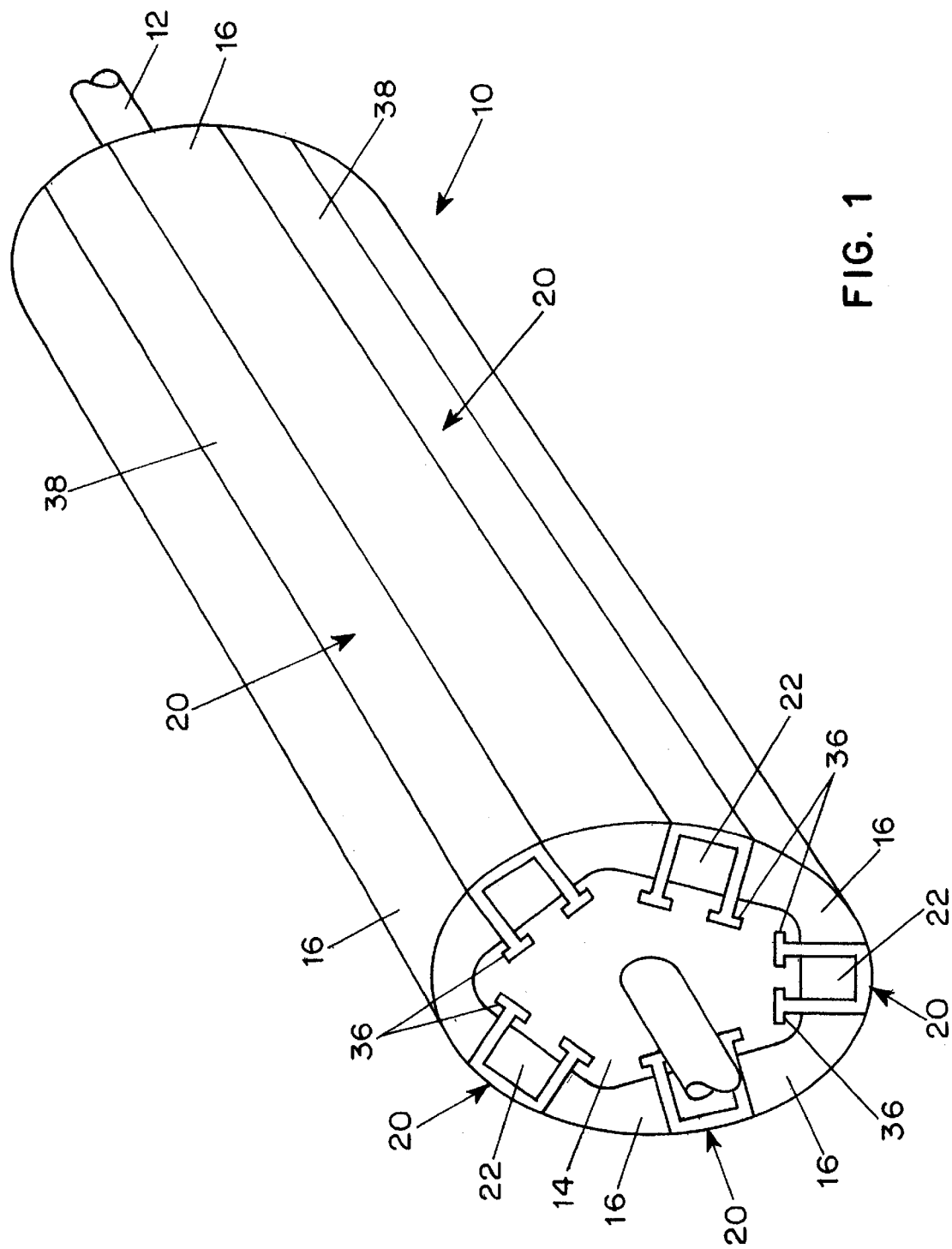
FIG. 1 is a perspective schematic view showing a representative embodiment of a rotor for high speed machines having nonmagnetic magnet retention channels arranged in accordance with the invention.

The typical embodiment of a high speed component for an electrical machine shown in FIG. 1 is in the form of a rotor 10 having a shaft 12 carrying a nonmagnetic core 14, and having radially projecting ferromagnetic pole pieces 16 made, for example, from laminated sheets of ferromagnetic material, angularly distributed around the periphery of the core 14 and supported from the core in any conventional manner. In order to retain permanent magnets in position between the pole pieces without introducing dovetails or other discontinuities in the flux path, a magnet retention channel arrangement 20 made of nonmagnetic material and containing one or more permanent magnets 22 is mounted in the space between each adjacent pair of pole pieces 16.

Figure 2:
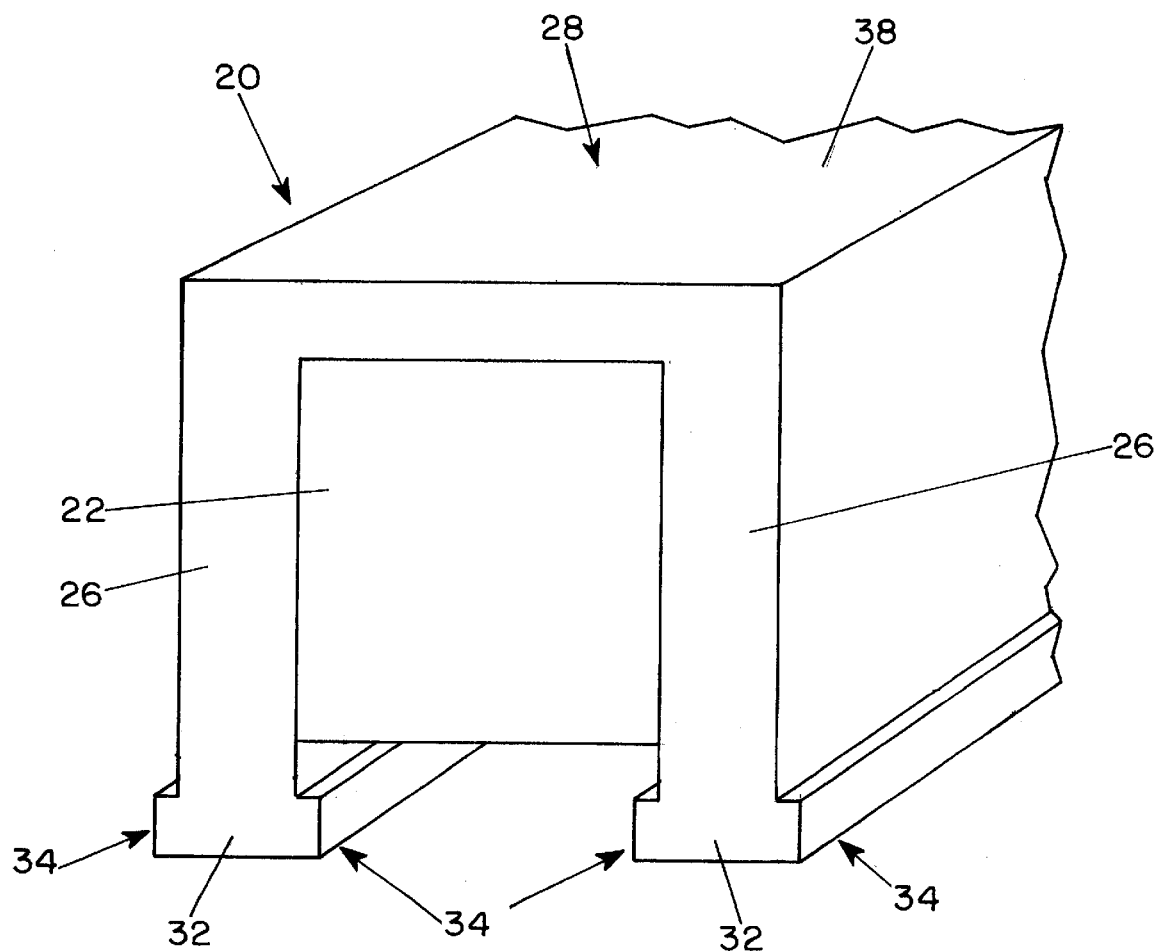
FIG. 2 is a perspective schematic view illustrating the typical magnet retention channel arrangement provided in the embodiment illustrated in FIG. 1.

As best seen in FIG. 2, the magnet retention channel arrangement 20 has two spaced parallel side walls 26, preferably of uniform thickness, which are integral at their radially outer ends with an end wall 28. The opposite, radially inner ends of the side walls 26 are integrally formed with feet 32 having lateral projections 34 extending toward and away from the channel formed by the U-shaped channel member Because the side walls 26 are preferably of uniform thickness and the dovetail projections 34 to be received in corresponding grooves 36 in the nonmagnetic core 14 are located away from the flux path through the side walls 26 between the magnet 22 and the adjacent ferromagnetic pole pieces 16, any magnetic shorting or discontinuity in the flux path between each magnet and the adjacent pole pieces is avoided. If desired, the outer face 38 of the end wall 28 may have a curvature corresponding to the curvature of the periphery of the rotor 10 as shown in FIG. 1.

The nonmagnetic U-shaped channel 20 is an integral unit preferably made by machining or shaping a solid piece of nonmagnetic material such as stainless steel, or by extrusion, pultrusion or hot isostatic pressed powder metallurgy techniques similar to those used to form jet turbine rotors. Because the U-shaped channel 20 is an integral unit made of the same material throughout and is mechanically interlocked with the rotor hub it is capable of withstanding the high centrifugal forces applied during high speed operation of the rotor 10 to a greater extent than a channel member made of different components or materials joined together. For this reason the side walls 26 can be made thinner, reducing the length of the gap in the magnetic circuit formed by the presence of nonmagnetic material. If necessary, moreover, the strength of the magnets 22 can be increased to compensate for the presence of the nonmagnetic material in the circuit.

By providing an integral nonmagnetic channel member having a mechanically interlocking connection with the hub, magnetic flux path discontinuities and magnetic shorting are substantially eliminated while maximizing magnet retention strength.

Although the invention has been described herein with reference to specific embodiments, many modifications and variations therein will readily occur to those skilled in the art. Accordingly, all such variations and modifications are included within the intended scope of the invention.

We claim:

1. A magnet retention channel arrangement for a high speed rotor comprising:

a nonmagnetic rotor core; and a U-shaped channel member made of nonmagnetic material having substantially parallel side walls and an end wall joining the side walls at one end thereof, each side wall having a foot portion with a lateral projection at another end of the side wall opposite the end wall, each foot portion being received in a corresponding opening in the nonmagnetic core.

2. A magnet retention channel arrangement according to claim 1 wherein the foot portions of the side walls include lateral projections extending inwardly into the channel formed by the channel member.

3. A magnet retention channel arrangement according to claim 1 wherein the foot portions include lateral projections extending outwardly away from the channel formed by the channel member.

4. A magnet retention channel arrangement according to claim 1 wherein the channel member has a uniform cross-section and an open end to permit a magnet to be inserted into the channel.

5. A magnet retention channel arrangement according to claim 1 including at least one permanent magnet contained in the space between the side walls.

6. A magnet retention channel arrangement according to claim 1 wherein the channel member is made by machining a block of nonmagnetic metal.

7. A magnet retention channel arrangement according to claim 1 wherein the channel member is made by extrusion.

8. A magnet retention channel arrangement according to claim 1 wherein the channel member is made by pultrusion.

9. A magnet retention channel arrangement according to claim 1 wherein the channel member is made by a hot isostatic pressed powder metallurgy technique.

10. A high speed rotor comprising:

a central shaft;

a nonmagnetic core affixed to the central shaft;

a plurality of radially projecting, angularly spaced pole pieces made of ferromagnetic material and supported from the core; and a plurality of nonmagnetic U-shaped magnet retention channel members, each channel member being mounted between an adjacent pair of pole pieces and including a pair of spaced side walls adjacent to the pole pieces, an end wall joining the side walls at one end thereof and a pair of feet having lateral projections received in corresponding openings in the nonmagnetic core.

11. A magnet retention channel arrangement according to claim 10 including at least one permanent magnet disposed in the channel formed by each of the U-shaped channel members.

12. A high speed rotor arrangement according to claim 11 wherein the feet have projections received in corresponding recesses in the core at locations outside the path of magnetic flux from the permanent magnet to the adjacent pole pieces.

13. A high speed rotor arrangement according to claim 11 wherein the side walls of the channel members have uniform thickness to avoid magnetic discontinuities in the magnetic flux paths between the permanent magnets and the adjacent pole pieces.

* * * * *